Figures 1, 2:
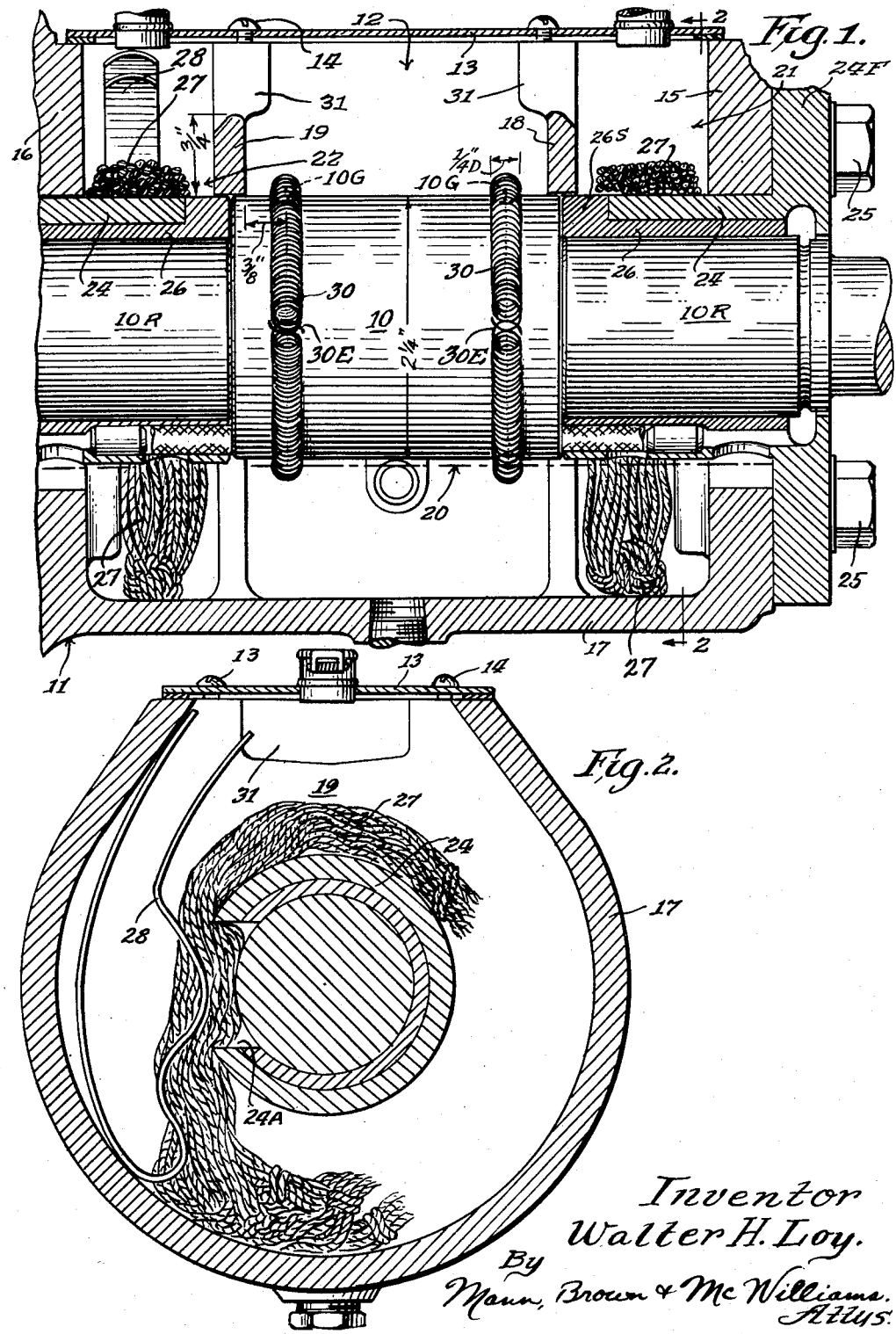

May 17, 1960 W. H. LOY 2,937,057
ARRANGEMENT FOR LUBRICATING SLEEVE BEARINGS
Filed July 10, 1958

Inventor
Walter H. Loy.
By
Mann, Brown & McWilliams.
Attys.

2,937,057
ARRANGEMENT FOR LUBRICATING SLEEVE BEARINGS

Walter H. Loy, Arlington Heights, Ill., assignor to Bell & Gossett Company, a corporation of Illinois Application July 10, 1958, Serial No. 747,651

9 Claims. (Cl. 308—127)

This invention relates to an improved arrangement for lubricating the sleeve bearing of a rotating shaft and, more particularly, is concerned with providing an oil slinger device that throws a mist of oil onto the top of the usual bearing wick for supplementing the capillary action of the wick.

Efficiency of bearing lubrication is becoming increasingly important, particularly in the pump field wherein the applications involving the handling of high-temperature liquids are increasing day by day. For example, there now are numerous applications where water is pumped at temperatures running on the order of 300° F. to 350° F. The presence of these high-temperature liquids inevitably imposes rigorous conditions on the bearings and results in the bearings running at abnormally high temperatures. It is important, therefore, that the lubricating system should not aggravate this temperature problem, and this requires greatly increased efficiency of the lubricating action.

It is the principal object of this invention to provide a simple, low-cost arrangement for supplementing the supply of oil to the usual lubricating wick of a sleeve bearing for a rotating shaft.

Briefly, this is accomplished by providing an oil-slinging arrangement conveniently mountable on the rotating shaft for throwing a mist of oil onto the top of the wick, with the wick also supplying oil to the shaft bearing by capillary action.

Other objects and advantages will become apparent during the course of the following description.

In the accompanying drawings forming a part of this specification and in which like numerals are employed to designate like parts throughout the same:

Fig. 1 is a fragmentary, longitudinal, sectional view through a sleeve bearing arrangement for a rotating shaft illustrating the oil slinger of this invention applied thereto; and Figure 2 is a transverse, sectional view taken approximately on line 2—2 of Fig. 1.

Referring now to the drawings, for purposes of disclosure the invention is illustrated in connection with a conventional double-ended sleeve bearing arrangement for a rotating shaft 10. The arrangement includes a bearing frame designated generally as 11 and having integral housing walls defining a semi-compartmented bearing chamber 12 that is open at the top, with a removable cover plate 13 suitably fixed to the frame by releasable fasteners 14 and closing off the top of the bearing chamber. The frame includes opposed outer and inner end walls 15 and 16, respectively, connected by a main housing wall 17 of a generally rounded configuration (see Fig. 2) with transversely extending internal reinforcement webs 18 and 19 extending around the sides and across the top of the shaft 10. The bearing frame thus provides a reservoir along the bottom of the bearing chamber for receiving oil or other lubricant, the preferred level of which is indicated at 20. The end walls 15 and 16, together with the internal reinforcement webs 18 and 19, define wicking chambers 21 and 22, respectively, at opposite ends of the bearing chamber.

A sleeve bearing assembly is provided in each wicking chamber and includes a sleeve bearing member 24 having an attachment flange 24F fixed to the adjacent end wall of the bearing frame by cap screws 25 and a bearing liner 26 pressed within the sleeve 24 and including an external shoulder 26S in endwise abutment between the sleeve 24 and the shaft 10, which is reduced in the regions 10R thereof which are received within the sleeve bearings.

Each wicking chamber receives suitable lubricant-supplying facilities in the form of a wick 27 that is draped about the bearing sleeve 24 and extends into the lubricant in the reservoir for drawing lubricant from the reservoir and delivering it to the sleeve bearing by capillary action, and resilient means in the form of an open-loop leaf spring 28 that is arranged within the bearing chamber to react against the main housing wall 17 and press the wick material through openings 24A in the sides of the sleeve bearing and into light wiping contact with the reduced section 10R of the shaft.

The arrangement described thus far is typical of sleeve bearing constructions which have long depended upon a simple wicking action for providing a low-cost lubricating system. Such lubricating systems fall considerably short of perfection in that they permit the bearing to run at temperatures that are well in excess of the temperatures of the surrounding parts; for example, in the pumping of liquids wherein the pump shaft is mounted in a conventional sleeve bearing and with the liquid being pumped having a temperature on the order of 132° F., the bearing normally runs at a temperature of as much as 180° F. to 190° F. Such inefficiencies in the bearing lubrication cannot be tolerated in applications wherein a pump is to handle liquids that may run to as high as 300° F. or 350° F. These extremely high temperatures present many problems in and of themselves, and it becomes quite important that the lubricating system should not aggravate these problems.

In the illustrated arrangement, wherein the capacity of the lubricating system depends only upon the capillary action of the wick, it has not heretofore been possible to supply a sufficient quantity of oil to the bearing, and the problem has been to supplement the capillary action of the wick material. This is solved by providing an oil slinger for throwing a limited quantity of oil across the top of the bearing, where the wick material receives it and feeds it to the region to be lubricated.

In the double-ended arrangement of the present disclosure, a separate ring-like oil slinger 30 is provided for supplementing the supply of oil to each of the sleeve bearings 24 and for this purpose is arranged closely about the shaft for rotation therewith, with the body of each oil slinger being set in an endless locating groove 10G and projecting beyond the periphery of the shaft for partial immersion in the lubricant of the reservoir so that each oil slinger throws a mist of oil upwardly and axially through the bearing chamber while the shaft is rotating. The oil slingers are spaced apart along the shaft at points intermediate the reinforcement webs 18 and 19 so that each reinforcement web is disposed between the adjacent sleeve bearing and oil slinger. Accordingly, each web is arranged to provide a weir 31 opening along the top of the shaft, with the oil mist thrown up by the oil slinger passing through the adjacent weir to reach the sleeve bearing.

As is apparent in Fig. 1, close mounting clearances exist between the shaft 10 and the reinforcement webs, and since the oil slingers 30 project beyond the surface of the shaft, provision is made for first removing the oil slingers to thereby facilitate endwise removal of the shaft from the bearing chamber. Access to the bearing chamber for the purpose of removing the oil slingers is provided by the removable cover 13, and the oil slingers themselves are preferably comprised of a length of a resilient body that is looped tightly about the shaft and releasably fastened together at its opposite ends. The resilient character of the oil slinger affords sufficient play for engaging or disengaging the ends while still permitting the looped body to grip the shaft tightly.

The amount of oil reaching each bearing is carefully regulated to avoid excesses such as would result in leakage of oil through the sleeve bearings. Of even more critical nature, however, is the character of the spray of oil that is thrown by the oil slinger. This spray has been referred to as a mist, and this term is here defined as meaning that the oil droplets are substantially free of air as distinguished from a foamy spray which is characterized by a mechanical mixture of oil and air. The development of foaming in the bearing chamber (such as is caused where the oil slinger, in moving through the lubricant, generates a turbulence in the reservoir) must be avoided inasmuch as this inevitably leads to breakdown of the oil film with a consequent serious loss of lubricating effectiveness.

In accordance with this invention, the quantity and character of the oil spray that is thrown onto the bearing and associated wick is controlled in part by the mounting location of the oil slinger and in part by the use of an oil slinger of proper size and surface configuration.

The oil slinger body, in accordance with the preferred form of the invention, consists of a length of coil spring that is looped about and closely engaged with the shaft. The coil spring loop is seated on the shaft groove 10G so that the adjacent turns of the spring are in tight, closely drawn engagement, and this minimizes the tendency for the slinger to establish a splashing or turbulence such as would result in a foamy spray. The end turns 30E of each coil spring are secured in releasable looped engagement and may readily be disengaged manually for removing the spring from the shaft.

In a preferred constructional embodiment, the enlarged portion of the shaft 10 has a diameter on the order of 2¼″ and the individual turns of the coil spring have a diameter of ¼″, with the spring being spaced axially from the adjacent reinforcing web such that the distance between the center line of the spring and the adjacent face of the web is ⅜″, and with the height of the wall portion of the web that extends from the top of the shaft to the bottom of the weir being approximately ¾″. This arrangement has given exceptionally effective lubricating efficiency. For example, when used with a continuously operating pump handling liquids having temperatures on the order of 132° F., the bearing temperature has been maintained at 140° F. with this arrangement, whereas, without the benefit of the oil slinger of this invention, the bearing temperature has typically run as high as 180° F. to 190° F. In this preferred constructional embodiment, the spring is arranged so that only one-half of each turn is immersed in the reservoir of the lubricant, and this factor has been found to be somewhat critical though, obviously, minor departures are tolerable.

It will be apparent that other forms may be employed for the oil sprinkler body; for example, a plastic or rubber ring could be employed, though in the case of these smooth-surfaced materials, it would be desirable to form the surface with irregularities of appropriate size and shape. It will be apparent that the various mounting arrangements may involve slight modifications in the form of the irregularities. In some instances it may be sufficient to merely roughen the outer surface of the rubber or plastic ring, while in other instances it will be preferable to form distinct warts or barbs along the outer surface of these rings. In any of these situations, the controlling criterion is that the oil slinger be of such irregularity and be immersed to such extent as to throw a mist of oil.

It should be understood that the description of the preferred form of the invention is for the purpose of complying with Section 112, Title 35 of the U.S. Code and that the claims should be construed as broadly as prior art will permit.

I claim:

1. An oil slinger for lubricating a sleeve bearing arrangement for a rotating shaft, said arrangement including a bearing frame having housing walls forming a bearing chamber having a reservoir for lubricant along the bottom of the chamber, a shaft projecting through said chamber above the level of the lubricant in said reservoir, a sleeve bearing in telescoping, supporting engagement around said shaft, and a lubricating wick communicating between the lubricant in said reservoir and said shaft at a point intermediately along said sleeve bearing; said oil slinger comprising a length of coil spring in the form of an endless loop closely encircling said shaft at a point thereon spaced axially from said wick, said spring having adjacent turns thereof tightly engaged, with said turns projecting beyond the periphery of said shaft into partial immersion in said lubricant for throwing a mist of lubricant onto said wick when said shaft rotates.

2. An oil slinger for lubricating a sleeve bearing arrangement for a rotating shaft, said arrangement including a bearing frame having housing walls forming a bearing chamber having a reservoir for lubricant along the bottom of the chamber, a shaft projecting through said chamber above the level of the lubricant in said reservoir, a sleeve bearing in telescoping, supporting engagement around said shaft, and a lubricating wick communicating between the lubricant in said reservoir and said shaft at a point intermediately along said sleeve bearing; said oil slinger comprising a ring-like body of resilient, smooth-surfaced material closely encircling said shaft at a point thereon spaced axially from said wick, said body having an outer peripheral surface of slightly irregular external configuration projecting sufficiently beyond the periphery of said shaft and into the lubricant in said reservoir for throwing a mist of lubricant onto said wick when said shaft rotates.

3. In a sleeve bearing arrangement for a rotating shaft, said arrangement including a bearing frame having housing walls forming a bearing chamber having a reservoir for lubricant along the bottom of the chamber, said housing walls including an integral internal reinforcement web extending transversely across the top of said chamber, a shaft projecting through said chamber above the level of the lubricant in said reservoir, a sleeve bearing in telescoping, supporting engagement around said shaft adjacent one face of said web, and a lubricating wick communicating between the lubricant in said reservoir and said shaft at a point intermediately along said sleeve bearing; the improvement wherein a ring-like oil slinger member tightly encircles said shaft at a point thereon in adjacent, spaced relation to the opposite face of said web, said oil slinger member projecting beyond the periphery of said shaft for partial immersion in said lubricant to throw a mist of lubricant when said shaft rotates, and wherein said web provides a weir opening across the top of said shaft with the mist thrown by the oil slinger member passing through the weir to fall onto the wick.

4. In a sleeve bearing arrangement for a rotating shaft, said arrangement including a bearing frame having housing walls forming a bearing chamber having a reservoir for lubricant along the bottom of the chamber, said housing walls including an integral internal reinforcement web extending transversely across the top of said chamber, a shaft projecting through said chamber above the level of the lubricant in said reservoir, a sleeve bearing in telescoping, supporting engagement around said shaft adjacent one face of said web, and a lubricating wick communicating between the lubricant in said reservoir and said shaft at a point intermediately along said sleeve bearing; the improvement wherein said shaft is provided with an endless groove at a point thereon in adjacent spaced relation to the opposite face of said web, a ring-like body of resilient, smooth-surface material is disposed in said groove in closely encircling relation of said shaft, said body having an outer surface portion of slightly irregular external configuration projecting into said lubricant to throw a mist of lubricant, and wherein said web provides a weir opening across the top of said shaft with the mist thrown by said body passing through the weir to fall onto the wick.

5. In a sleeve bearing arrangement for a rotating shaft, in combination: a bearing frame having housing walls forming a bearing chamber having a reservoir for lubricant along the bottom thereof, said housing walls including integral end walls for said chamber and internal reinforcement webs extending across the top of said chamber and partially defining wicking chambers at opposite ends of said chamber, each of said reinforcement webs having a weir opening, a shaft projecting through said chamber above the level of the lubricant in said reservoir, a separate sleeve bearing in each wicking chamber and each arranged in telescoping, supporting engagement around said shaft, lubricant-supplying means in each wicking chamber for feeding lubricant from said reservoir to said shaft and each comprising wick material extending from said reservoir around the top of said sleeve bearing, resilient means reacting against said bearing frame to urge said wick material through an opening in said sleeve bearing into light wiping contact with said shaft, and ring-like oil slinging means intermediate said webs and tightly encircling said shaft for partial immersion in the lubricant of said reservoir to throw a mist of lubricant through said weirs onto the top of said wicks when said shaft rotates.

6. The arrangement of claim 5 wherein said bearing frame has a removable cover across the top of said bearing chamber and said oil slinging means comprises a length of material having releasable engageable ends for forming the same into an endless loop about said shaft.

7. The arrangement of claim 5 wherein said oil slinging means comprises a length of coil spring in the form of an endless loop closely encircling said shaft, said spring having adjacent turns thereof tightly engaged, with said turns projecting only partially into said lubricant.

8. In a sleeve bearing arrangement for a rotating shaft, said arrangement including a bearing frame having housing walls forming a bearing chamber having a reservoir for lubricant along the bottom of the chamber, said housing walls including an integral internal reinforcement web extending transversely across the top of said chamber, a shaft projecting through said chamber above the level of the lubricant in said reservoir, a sleeve bearing in telescoping, supporting engagement around said shaft adjacent one face of said web, and a lubricating wick communicating between the lubricant in said reservoir and said shaft at a point intermediately along said sleeve bearing; the improvement wherein a ring-like body of resilient, smooth-surfaced material is disposed in closely encircling relation on said shaft at a point thereon in adjacent spaced relation to the opposite face of said web, said body having an outer surface portion of slightly irregular external configuration projecting into said lubricant to throw a mist of lubricant, and wherein said web provides a weir opening across the top of said shaft with the mist thrown by said body passing through the weir to fall onto the wick.

9. The arrangement of claim 8 wherein said body comprises a length of coil spring in the form of an endless loop closely encircling said shaft, said spring having adjacent turns thereof tightly engaged, with said turns projecting only partially into said lubricant.

References Cited in the file of this patent

UNITED STATES PATENTS

| 333,868 | Lauhoff | Jan. 5, 1886 |
| 799,978 | Erickson | Sept. 19, 1905 |
| 1,096,298 | Garber | May 12, 1914 |

FOREIGN PATENTS

| 655,820 | Germany | Jan. 24, 1938 |